Oct. 27, 1964 W. R. HOWARD 3,154,736
MECHANICAL ARRANGEMENT FOR THERMOCOUPLE JUNCTIONS
Filed May 29, 1962

INVENTOR.
WILLIAM R. HOWARD
BY Richard MacCutcheon
ATTY.

United States Patent Office 3,154,736
Patented Oct. 27, 1964

3,154,736
MECHANICAL ARRANGEMENT FOR THERMO-
COUPLE JUNCTIONS
William R. Howard, Twinsburg, Ohio, assignor to Assembly Products, Inc., Chesterland, Ohio, a corporation of Ohio
Filed May 29, 1962, Ser. No. 198,488
3 Claims. (Cl. 324—106)

The present invention relates to thermocouple design and is believed to have particular significance in connection with thermocouples useful in the measurement of currents in radio frequency circuits, where ordinary "shunts" can not be employed as is well known to the art.

Past difficulties may best be understood by consideration of the accompanying FIG. 1 representing prior art and where it is assumed that a meter has a pointer 10 tured by a movable coil 11 responsive to interaction of coil current and the field of a permanent magnet 12. To measure radio frequency currents in a conductor 13, the conductor is split into sections 13a and 13b, respectively attached to a pair of copper base plates 14 joined by a heater wire 16 soldered, or otherwise intimately secured at each end, to the respective base plates and the heater wire carries a hot thermocouple junction 17 which supplies a small direct current to the sensitive coil 11.

With no current through the heater wire (after long inoperation) the temperature of the copper blocks and the temperature of the hot junction are at room ambient $t_a$. The meter is also at room temperature $t_a$. When current is passed through the heater wire 16, the temperature of the hot junction becomes $t_h$, and the output is indicated by the meter will be proportional to "$t_h$ minus $t_a$."

After some time, operating at the same constant current level, the copper blocks 14 begin to increase in temperature over room ambient, due mostly to convection and conduction from the heater wire. This temperature increase may be called "$dt$" and it adds to the temperature at the heater thermocouple junction. Assuming that the meter is still at room temperature, the output now indicated by the meter is proportional to "$t_h$ plus $dt$ minus $t_a$." $dt$ will continue to increase with time until the copper blocks dissipate heat at a rate equal to the added heat supplied by the heater.

There thus arises a grave difficulty, in the prior art, because the meter reading will not stabilize rapidly, will not permit an accurate reading to be taken without waiting long periods of time. Also, because the cold junction reference is at the meter, a further error will be present if the thermocouple and the meter are used in different ambients.

It is an object of the present invention to provide simple means for overcoming the above mentioned difficulties.

Other objects and advantages will become apparent and the invention may be better understood from consideration of the following description taken in connection with the accompanying drawings, in which.

Figure 2:
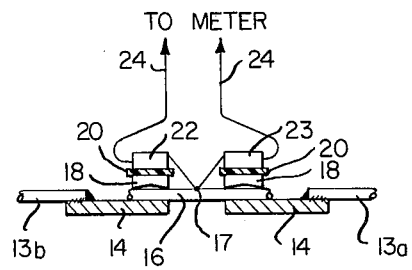
FIG. 2 is a diagrammatic representation of a crude way of overcoming the above difficulties.

Referring now to FIG. 2, like parts are like numbered as before, but it will be seen that at one side the mounted-on-base-blocks hot wire 16 has its corresponding end covered by a metal clamping block 18 on which there is a thin mica insulator 20 (whose thickness is greatly exaggerated in the drawing for clarity of showing) and on which is superposed that which I call a cold junction reference block 22. At the opposite end, above the heater wire 16, is a similar clamping block 18, insulation 20, and cold junction reference block 23. The dissimilar metal leads of the thermocouple are taken from the hot junctions 17 to the respective blocks 22 and 23 (of good electrical and heat conductive material, such as copper) and then through leads 24 (presumably of relatively large size copper) to the meter. Now when an initial current flows through 13a, 13b, the initial output is proportional to $t_h$ minus $t_a$ as before. After some time at constant current, the heat which is transmitted to the copper base blocks is also transmitted through the mica insulators to the cold junction reference blocks and it can be readily arranged so that the temperature of the reference blocks 22 is approximately equal to the temperature of the base blocks 14. The equation for the output of the transducer is now proportional to "$t_h$ plus $dt$ minus ($t_a$ plus $dt$)" or, in other words, exactly equal to the initial reading. Furthermore, the resulting output has become relatively insensitive to change in room ambient, and is also unaffected by the fact that ambients of meter and thermoelement may differ.

Figure 1:
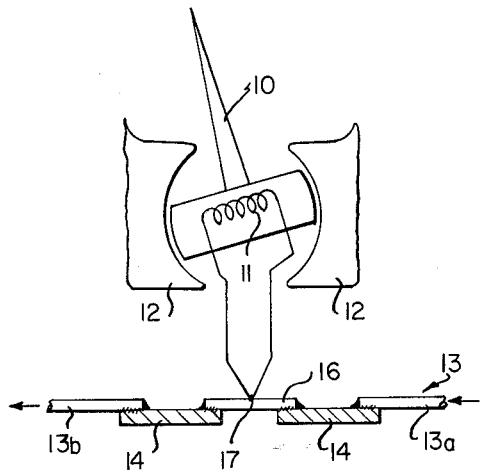
FIG. 1 represents a prior art arrangement, as discussed above.
Figure 3:
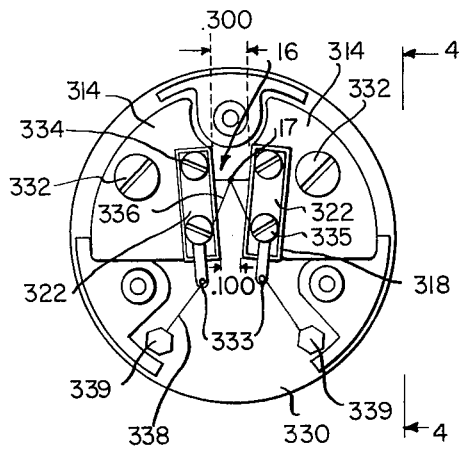
FIG. 3 is a plan view of an arrangement representing a preferred embodiment of the invention.
Figure 4:
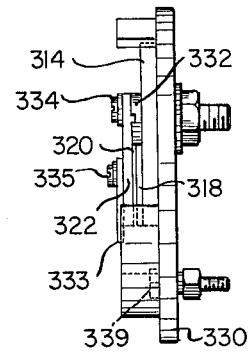
FIG. 4 is a sectional view taken in the line 4—4 of FIG. 3.

One difficulty with the arrangements of either FIGS. 1 or 2 is that they do not permit for easy adjustment of heater wire lengths, to provide a specific output voltage (for a certain main current to be measured) and/or for accommodating different values of heater resistance as encountered in the field This difficulty is solved by the preferred arrangement as shown in FIGS. 3 and 4.

In FIGS. 3 and 4 a pair of relatively large (for example, 0.1 inch thick) opposite hand somewhat kidney shaped copper pieces 314 are mounted on a machined base 330 of insulating material. Each copper piece 314 is capable of very limited rotation about the respective one of a pair of screws 332 (except when the screw is tightened). Each kidney (314) carries its own hot wire clamping plate 318, a superposed insulator plate 320, a cold junction reference block 322, terminal lug 333 and properly insulated clamping screws 334, 335. Even if plates 314 are 0.1 inches thick, the clamping blocks and cold junction block (such as 318 and 322) can be merely .05 inch thick copper, while the thin insulator plate 320 is .001 inch thick mica. As indicated in the drawing the points of nearest adjacency of the block at one side with respect to the block at the other side can taper from 0.3" at the top of the cold junction block assembly to 0.1" at the bottom of the cold junction block assembly. This means that a hot wire 16 (carrying hot junction 17) can be moved up and down the V thus formed to have its effective length varied as soon as screws 334 and 335 are tightened to provide desired clamping action, which can be enhanced by providing V grooved bottoms on 318, as already indicated in connection with elements 18 in FIG. 2. Such "V's" in the bottoms of the copper clamping bars provide increased contact pressure and insure good contact of heater wire to clamping blocks 318 overcoming a problem which has heretofore existed whenever heater wire is not soldered to base.

Figure 5:
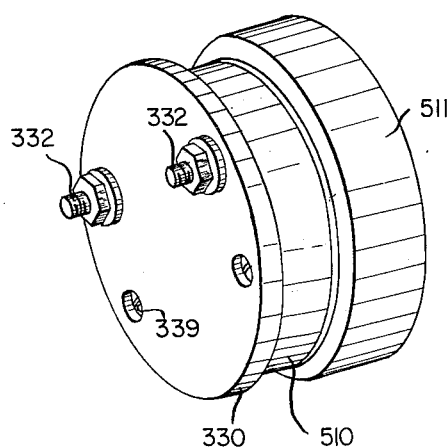
FIG. 5 is an assembly view showing a cover and meter for the device of FIGS 3 and 4.

The two thermocouple wires (336 in FIG. 3) are dissimilar, one for example being of platinum-iridium alloy while the other is of gold-palladium alloy having the advantage that with the normal copper content of the long leads (24) the junctions formed by the copper wires with the respective short wires will have substantially like thermoelectric coefficients and polarities, as is known to the art. However, the wires 338 taken from the cold junction block lugs 333 to terminal screws 339 are of similar material (usually copper) as are the leads (not shown) from terminals 339 to the meter coil. It is a simple matter to have the same assembly serve as a mounting for the indicating meter. Thus, in FIG. 5, the base 330 carries a junction block assembly enclosing ring 510 which in turn carries an indicating meter 511. On the back of base 330 the screws 332 serve as to-be-measured main current connection studs while the thermocouple output terminal screws 339 are turned around (from the showing in FIG. 4) and serve to carry signal to the meter. Of course other means could be used instead and the main connection studs could lead to the circuit of the hot wire otherwise than through screws 332 and main plates 314.

For original setup, for use with any particular meter and to measure any particular range of radio frequency current, the meter is removed and the screws 332 can be loosened and the kidneys swung together as much as possible for closest adjacency at the top of the V, and the heater wire placed up or down along the V to meet electrical requirements, and then the screws 334 and 335 tightened, and then the kidneys swiveled apart at the top and the screws 332 tightened, and the meter replaced.

For the higher ampere ratings a wire mesh cage could be used instead of a solid cover, and cooling fins could be provided on the various parts subjected to heating. At the radio frequencies contemplated, however, care must be taken to not set up capacity effects but these can be avoided by having half of the fins extend at right angles to the other half of the fins.

While I have illustrated and described particular embodiments, various modifications may obviously be made without departing from the true spirit and scope of the invention as defined in the accompanying claims taken with all reasonable equivalents.

I claim:

1. Heater wire and thermocouple apparatus for producing an electrical signal proportional to value of current, said apparatus comprising main terminals for receiving the current to be measured, a pair of electrically conductive metal plates swivelably mounted to and in continuous electrical contact with said main terminals, a heater wire having two end portions respectively engaging said base plates, a pair of thermally conductive metal clamping blocks respectively engaging the end portions of the heater wire diametrically opposite the base plates, a pair of thin electrical insulation pieces respectively associated with said clamping blocks at positions thereon remote from the heater wire, a pair of cold junction reference blocks of thermally conductive metal adjacent said thin insulation pieces for receiving heat transfer from the clamping blocks while electrically insulated therefrom, unlike thermocouple wires extending from a hot junction on the heater wire each to a different one of the cold junction reference blocks, an indicating meter, like material electrically conductive leads extending from said cold junction reference blocks to said indicating meter, and means for clamping the cold junction reference blocks upon said insulating pieces and thus upon the clamping blocks and the clamping blocks upon the heater wire ends and the latter against the base plates.

2. Apparatus as in claim 1 further characterized by the conductive material base plates having a pair of opposed faces which in at least one position of their swivelable movement form a V along which the heater wire may be moved for changing its effective length.

3. Apparatus as in claim 1 further characterized by the clamping blocks having V contour shaped surfaces with outer legs of the V's having end points which engage the heater wire.

References Cited in the file of this patent

UNITED STATES PATENTS

| | | |
|---|---|---|
| 1,407,147 | Goodwin | Feb. 21, 1922 |
| 1,456,591 | Goodwin | May 29, 1923 |